(12) United States Patent
Murray

(10) Patent No.: US 10,659,251 B2
(45) Date of Patent: May 19, 2020

(54) RING PROTECTION NETWORK DIVISION

(71) Applicant: Hewlett Packard Enterprise Development LP, Houston, TX (US)

(72) Inventor: Christopher Murray, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/072,314

(22) PCT Filed: Feb. 26, 2016

(86) PCT No.: PCT/US2016/019710
§ 371 (c)(1),
(2) Date: Jul. 24, 2018

(87) PCT Pub. No.: WO2017/146718
PCT Pub. Date: Aug. 31, 2017

(65) Prior Publication Data
US 2019/0028298 A1 Jan. 24, 2019

(51) Int. Cl.
*H04L 12/423* (2006.01)
*H04L 12/46* (2006.01)
(Continued)

(52) U.S. Cl.
CPC .......... *H04L 12/423* (2013.01); *H04L 12/437* (2013.01); *H04L 12/4675* (2013.01);
(Continued)

(58) Field of Classification Search
CPC . H04L 12/423; H04L 12/4675; H04L 12/437; H04L 63/104; H04L 45/02; H04L 2012/421
See application file for complete search history.

(56) References Cited

U.S. PATENT DOCUMENTS 7,006,434 B1 2/2006 Klein et al.
7,499,647 B2 * 3/2009 Way ..................... H04B 10/503
398/3

(Continued)

FOREIGN PATENT DOCUMENTS

CN 102025584 4/2011

OTHER PUBLICATIONS

"G.8032 Ethernet Ring Protection Multiple Ring Topology", Alcatel Lucent, < https://infoproducts.alcatel-lucent.com/html/0_add-h-f/93-0267-HTML/7X50_Advanced_Configuration_Guide/G8032-MultiRing.html >, (Web Page), Retreived on Mar. 2, 2016, 23 pages.

(Continued)

*Primary Examiner* — Brian D Nguyen
(74) *Attorney, Agent, or Firm* — Hewlett Packard Enterprise Patent Department

(57) ABSTRACT

Examples herein involve dividing a ring protection network into multiple ring protection networks. Examples include detecting a disconnection in a ring protection network, determining whether an owner of the ring protection network is in a new ring protection network divided from the ring protection network, and establishing an owner of the new ring protection network based on whether the owner of the ring protection network is in the new ring protection network.

15 Claims, 12 Drawing Sheets

(51) Int. Cl.
    *H04L 12/751* (2013.01)
    *H04L 29/06* (2006.01)
    *H04L 12/437* (2006.01)
    *H04L 12/42* (2006.01)

(52) U.S. Cl.
    CPC ............ *H04L 45/02* (2013.01); *H04L 63/104* (2013.01); *H04L 2012/421* (2013.01)

(56) References Cited

U.S. PATENT DOCUMENTS

| | | |
|---|---|---|
| 8,588,060 B2 | 11/2013 | Holness |
| 2010/0290340 A1 | 11/2010 | Lee et al. |
| 2012/0224471 A1 | 9/2012 | Vinod et al. |
| 2013/0064071 A1 | 3/2013 | Bos et al. |
| 2015/0036546 A1 | 2/2015 | Singh |
| 2015/0085637 A1 | 3/2015 | Nahlous et al. |
| 2016/0028588 A1* | 1/2016 | Colven .................. H04L 41/12 370/254 |
| 2016/0142225 A1* | 5/2016 | Taniguchi ............. H04L 12/437 370/223 |
| 2016/0204976 A1* | 7/2016 | Singh ..................... H04L 12/40 370/216 |
| 2016/0352570 A1* | 12/2016 | Holness .............. H04L 41/0816 |
| 2017/0063617 A1* | 3/2017 | Sudharshan .......... H04L 12/462 |
| 2017/0180153 A1* | 6/2017 | Subramaniam ....... H04L 12/437 |

OTHER PUBLICATIONS

"ITU-T G.8032 Ethernet Ring Protection Switching", < http://www.cisco.com/c/en/us/td/docs/ios-xml/ios/cether/configuration/xe-3s/ce-xe-3s-book/ce-g8032-ering-pro.pdf >, (Web Page). Nov. 24, 2015, 28 pages.

International Searching Authority, The International Search Report and the Written Opinion, dated Nov. 22, 2016, PCT/US2016/019710, 11 Pgs.

Ryoo, J. D. et al., "Ethernet Ring Protection for Carrier Ethernet Networks", (Research Paper), Aug. 20, 2008, 8 pages.

* cited by examiner

RING PROTECTION NETWORK DIVISION

BACKGROUND

In a datacenter, network modules (e.g., Ethernet switches, Virtual Connect fabrics, etc.) may be linked to enhance connectivity and redundancy. Network modules may be linked in a variety of topologies. A ring topology provides a redundant path between each network module connected in a ring. Accordingly, a network module may be connected between two other network modules using two separate communication links. In some examples, the two communication links may send data, messages, packets, etc. in opposite directions (e.g., clockwise and counterclockwise) around the ring.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1A:
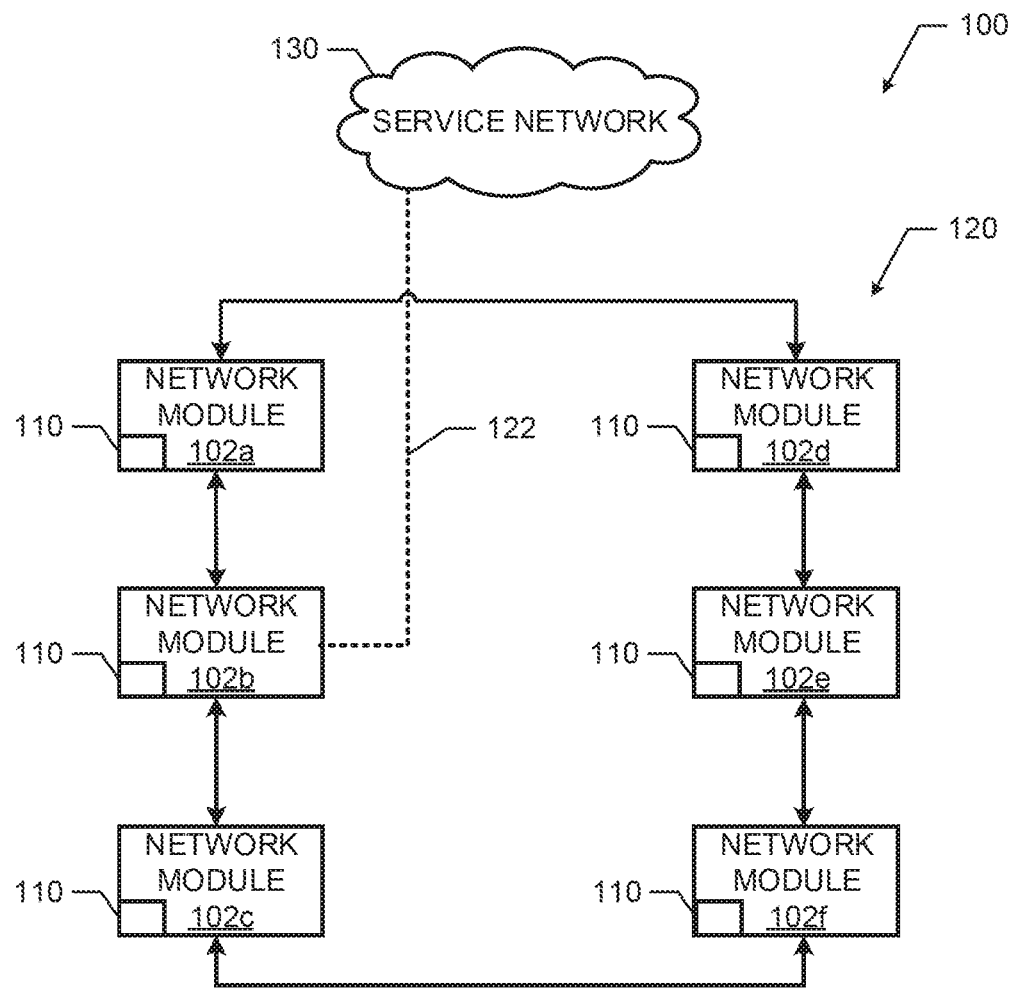
FIG. 1A illustrates a schematic diagram of an example ring protection network system including network modules with ring division managers implemented in accordance with an aspect of this disclosure.

Examples disclosed herein involve a ring protection network module to facilitate dividing a ring protection network into multiple ring protection networks. In examples herein, ring protection network modules may configure new ring protection networks from a single ring protection network by automatically selecting an owner network module for the new ring protection networks. In examples herein, the ring protection networks may include ring protection networks, in which an owner of the ring protection network controls communication between the ring protection network (e.g., a management network) and another network (e.g., a service network) and preserves the integrity of the ring protection network ((e.g., by preventing loops in customer traffic within the ring protection network or between the ring protection network and a service network).

Datacenters may include a plurality of servers or a plurality of enclosures including the servers. Communication between the servers may be facilitated using network modules. The example network modules may be configured in a management network ring, and the network modules may additionally be connected to a service network of a plurality of customer devices. Loops between the network modules and the service network may overload customer traffic causing performance degradation. Furthermore, disconnecting network modules may cause issues with managing loops in the customer traffic. For example, problems may arise when a new ring protection network that is created from a previous ring protection network (by disconnecting and rejoining two end network modules) does not include or identify an owner as the newly created ring protection network may then create a loop in the customer traffic with no owner to prevent the loop. In examples herein, when a newly created ring protection network is formed within a threshold period of time, an owner may be automatically identified or selected to ensure proper operation of the newly formed ring protection networks.

In examples herein, ring protection network modules and protocols facilitate automatic configuration of ring protection networks (e.g. management ring protection networks, such as a ring protection network) created from a ring protection network. More specifically, ring division managers of example ring protection network modules may detect when two ring protection network modules are disconnected from one another, detect a reconnection to another ring protection network module to form a new ring protection network, and determine a single owner of the newly created ring protection network from the previous ring protection network. The owner of the newly created ring protection networks may then establish a single uplink from the ring protection networks to a service network to prevent customer traffic loops in the ring protection networks or between the ring protection networks and the service network.

As used herein, a ring protection network is divided into multiple ring protected networks when the multiple ring protected networks form multiple disjoined ring protection networks comprised of the same network modules from the original ring protection network.

FIG. 1A illustrates a ring protection network system 100 including a management ring protection network 120. The management ring protection network 120 comprises ring protection network modules 102a-102f configured in a ring. For purposes of readability, the example network modules 102a-102f of FIG. 1A may be referred to herein collectively as the network modules 102. The network modules 102 include ring division managers 110 constructed in accordance with this disclosure. In examples herein, the ring division managers 110 of FIG. 1 automatically configure newly formed ring protection networks created from the network modules 102 of the ring protection network 120 (e.g., by identifying or assigning owners for the newly formed ring protection networks)

The ring protection network in FIG. 1A is formed into a "ring" as each network module 102 is linked to two other network modules 102 in a ring formation such that network module 102a is connected to network module 102b, which is connected to network module 102c, which is connected to network module 102f, which is connected to network module 102e, which is connected to network module 102d, which is connected to network module 102a to complete the ring protection network. As used herein, network modules are considered connected to one another when the network modules (e.g., the network modules 102a-102f) are directly communicatively coupled using a dedicated wired connection (e.g., an Ethernet connection) and disconnected from one another when the network modules are no longer directly communicatively coupled. The example dedicated wired connection may facilitate communication between the network modules using a variety of protocols (e.g., see FIG. 3).

The example system 100 of FIG. 1 may control a datacenter (e.g., a system of servers, etc.) that communicates or provides services to a service network 130. The example service network 130 may include a plurality of client or customer devices (e.g., computers, mobile devices, or any other type of computing device) that may access information in the datacenter of the system 100. The ring protection network 120 of FIG. 1A may include a single uplink 122 to the service network 130 to prevent a loop in customer traffic within the ring protection network 120.

In examples disclosed herein the network modules 102 may facilitate communication between servers in communication with each of the network modules 102. For example, each of the network modules 102 of FIG. 1A may manage communication with one or more servers. In some examples, the network modules 102 may be configured in pairs to manage communications for a server enclosure having a plurality of servers. In such an example, the pairs of network modules 102 may provide redundancy or backup services in the event one of the network modules 102 of a pair fails. The example ring protection networks 120 of FIG. 1A may be a G.8032 network.

Figure 1B:
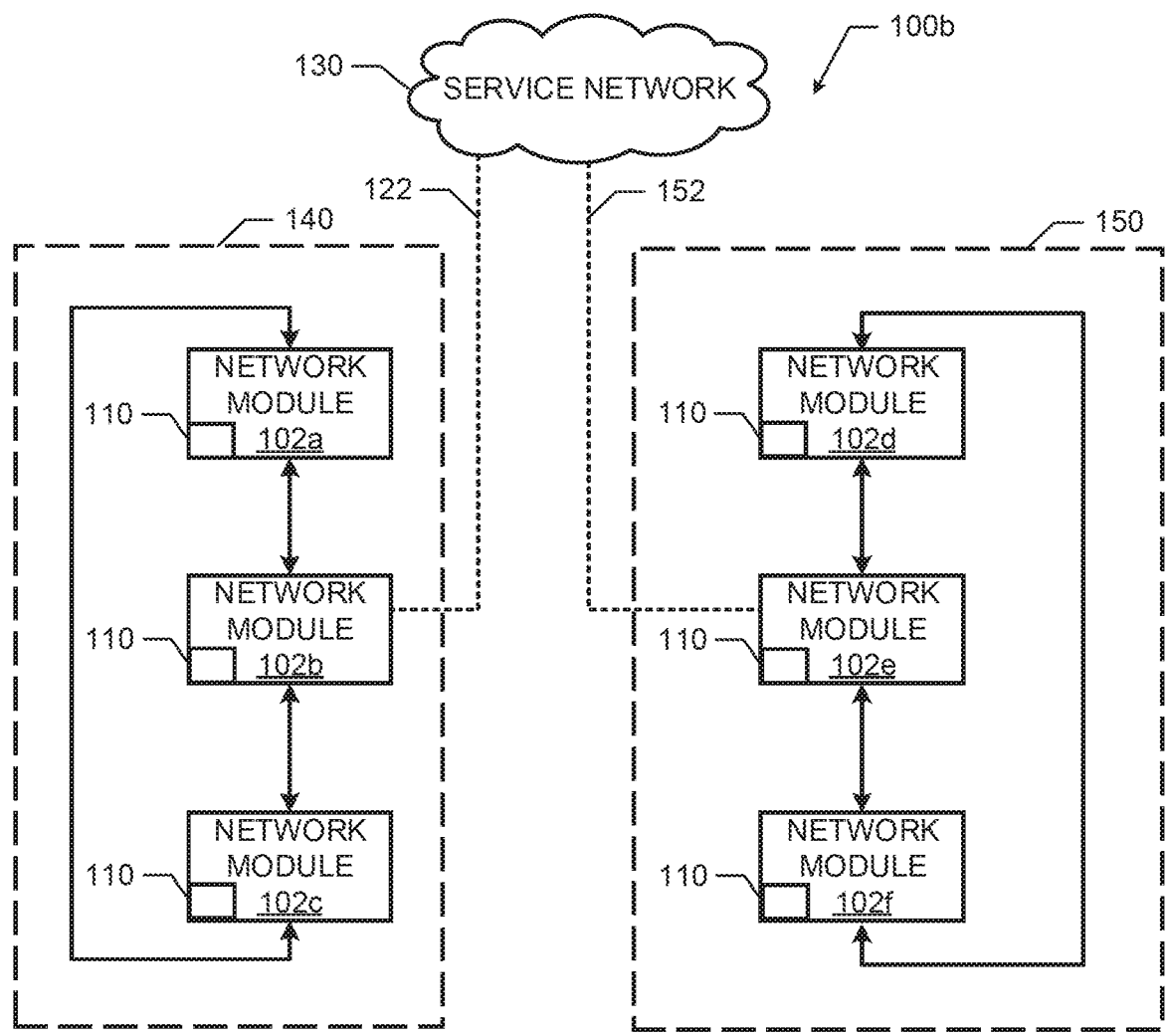
FIG. 1B illustrates a schematic diagram of multiple ring protection networks created from the ring protection network system of FIG. 1A using the example ring division managers in accordance with an aspect of this disclosure.

In examples disclosed herein, the ring protection network 120 may be divided into multiple ring protection networks using the ring division managers 110 of the network modules 102 (e.g., two ring protection networks of three network modules, three ring protection networks of two network modules, two ring protection networks, one with four network modules and one with 2 network modules, etc.). For example, the ring division managers 110 may facilitate division of the ring protection network 120 into two ring protection networks 130, 140 as illustrated in FIG. 1B (e.g., see FIGS. 4A-4E) using communication protocols (see FIG. 3) of the network modules 102 in accordance with aspects of this disclosure. An example implementation of a ring division manager 110 of the network modules 102 that may be used to implement the ring division manager 110 of FIG. 1 in accordance with aspects of this disclosure is further discussed below in connection with FIG. 2.

In FIG. 1B, a first ring protection network 140 is formed from the network modules 102a, 102b, 102c of FIG. 1A and a second ring protection network 150 is formed from the network modules 102d, 102e, 102f of FIG. 1A. For example, to create the two ring protection networks 130, 140, the network module 102c may be disconnected (e.g., by a user, switch, etc.) from the network module 102f and the network module 102a may be disconnected (e.g., by a user, switch, etc.) from the network module 102d. Then, the network module 102c may be connected to the network module 102a within a threshold period of time (e.g., a predetermined or user-designated, threshold period of time, such as 10 seconds, 20 seconds, etc.) to form the first ring protection network 140 and the network module 102d may be connected to the network module 102f to create the second ring protection network 150 with the threshold period of time. In some examples, if a network module is disconnected from one network module without being reconnected to another network module, the system 100 of FIGS. 1A and 1B may be configured to create a different type of management network (e.g., a linear network).

In FIG. 1B, the ring division managers 110 of the network modules 110 may identify or establish owners of the ring protection networks 140, 150 to maintain/establish two active uplinks 122, 152, respectively, with the service network 130 (e.g., from the network modules 102b, 102e). Further, the owner may disconnect links between the network modules to prevent loops in the customer traffic once connected to the service network 130. The two newly formed ring protection networks 140, 150 of FIG. 1B may continue to operate as G.8032 networks formed from the single G.8032 network of FIG. 1B.

Figure 2:
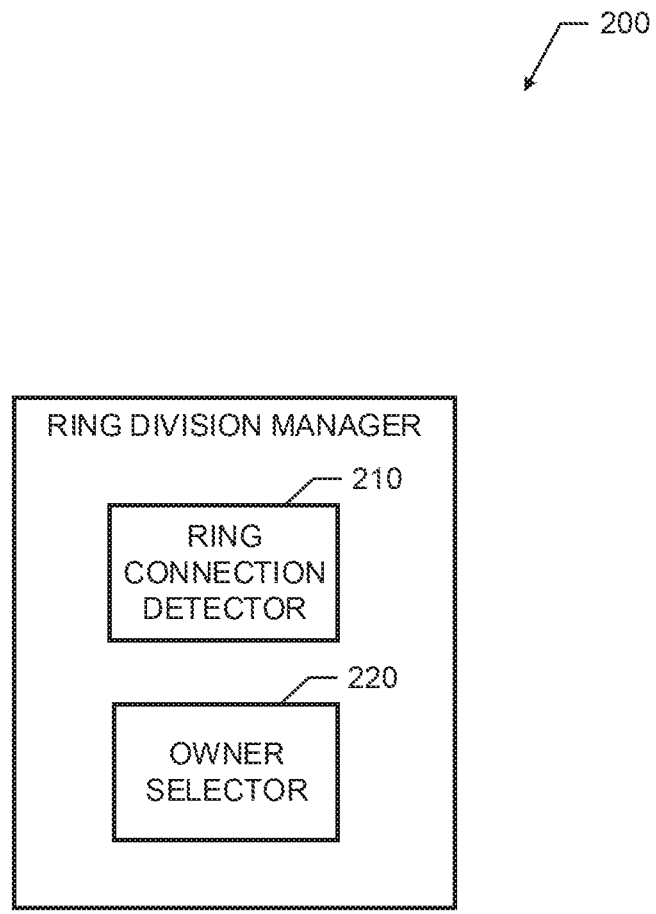
FIG. 2 a block diagram of an example ring division manager that may be used to implement the ring division managers in the network modules of the ring protection networks of FIGS. 1A and/or 1B.

FIG. 2 is a block diagram of an example ring division manager 200 that may be used to implement the ring division managers 110 in the network modules 102 of FIGS. 1A and 1B. In the illustrated example of FIG. 2, the ring division manager 200 includes a ring connection monitor 210 and an owner selector 220. In examples disclosed herein, the ring connection monitor 210 monitors connections of the network modules 102 and detects disconnections/reconnections from/to other network modules 102 of a ring protection network and the owner selector 220 configures owners of newly formed ring protection networks from the ring protection network.

In examples herein, the network modules 102 of the ring protection networks 120, 140, 150 send and receive owner identifications (e.g., MAC addresses, serial numbers, internet protocol (IP) addresses, etc.) to/from one another. For example, the network modules 102 may utilize a continuity check protocol (CCP) to communicate with adjacent (neighboring) network modules 102 in the ring protection network. Referring to the example of FIG. 1A, the network module 102b may periodically (or aperiodically) send continuity check messages to the network modules 102a, 102c. Additionally, the network module 102b may periodically (or aperiodically) receive continuity check messages from the network modules 102a, 102c. The example continuity check messages may include an owner identification that indicates the owner of the ring protection network (e.g., the ring protection networks 110, 120 of FIG. 1) of the network module 200. Further, in examples herein, the owner network modules may broadcast the identifier of the owner (e.g., MAC addresses, serial numbers, internet protocol (IP) addresses, etc.) to all other network modules 102 in the ring protection network using an owner selection protocol (OSP). The example network modules 102 may include ring protection managers to provide owner services (e.g., disabling customer traffic links, establishing uplinks, etc.).

In examples herein, the ring connection monitor 210 of FIG. 2 analyzes the messages received via the CCP and the OSP to detect disconnections and reconnections in the ring protection networks. For example, if the network module determines that a CCP has not been received, the ring connection monitor 210 may determine that the network module 102 is an end network module of a disconnected portion of the ring protection network. Accordingly, the ring connection monitor 210 may track signal fail conditions based on the CCP messages to determine whether the network module has been disconnected and reconnected.

The owner selector 220 selects an owner of a ring protection network using any suitable protocol. In examples herein, upon detection of a disconnection by the ring connection monitor 210 determine whether to select a new owner of the ring protection network based on whether there is communication with an owner. For example, in the event that an OSP message is not received for a period of time (e.g., 1 second, 2 seconds, etc.), the owner selector 220 may determine that the network module has been disconnected from the ring protection network because there is no message from the owner. The owner selector 220 may determine that its network module is an end network module. In such examples, the owner selector 220 may set its network module may as owner for its ring protection network (e.g., the newly created ring protection network that does not include the owner of a previous/original network). Accordingly, after setting its network module as owner, the end network module may begin broadcasting OSP messages to the remaining network modules of the newly formed ring protection network. Furthermore, the end network module begins handling owner operations to ensure the integrity of the ring protection network and prevent customer traffic loops in the network. In some examples, if two end network modules are set to owner, a protocol may be used to select a single owner for the new ring protection network (e.g., a network module with the lower MAC address). Accordingly, the end network module may deactivate communication links of customer traffic between the end network module and adjacent network modules until all network modules of the newly formed ring protection network recognize the new owner. Once all network modules in the new ring protection networks identify a same owner for their respective network, the owner may activate respective uplinks from the newly formed ring protection networks via a management port selection protocol (MPSP).

Furthermore, in the event the owner selector 220 of one of the network modules that is not an owner (e.g., a non-owner network module) receives an OSP message that is different from a previously received OSP message (e.g., a message received from the owner of the original ring protection network), the owner selector 220 of the non-owner network module may change its owner to the new owner network.

Furthermore, in examples herein, when network modules remain in communication with an owner in a newly created ring protection network (i.e., the owner from the original ring protection network remains in the newly created ring protection network), the ring division manager 110 may enable the network modules to resume normal operation despite detecting a disconnection from neighbor modules as the respective network module continue to receive broadcasted OSP messages corresponding to the same owner. Accordingly, a threshold period of time (e.g., 10 seconds, 20 seconds, etc.) may be used to determine whether to reconfigure a network of the network modules. FIGS. 4A-4E illustrate an example division of a ring protection network using the ring division manager 200 of FIG. 2 in accordance with examples herein.

While an example manner of implementing the ring division manager 110 of FIG. 1 is illustrated in FIG. 2, at least one of the elements, processes and/or devices illustrated in FIG. 2 may be combined, divided, re-arranged, omitted, eliminated and/or implemented in any other way. Further, the ring connection monitor 210, the owner selector 220, and/or, more generally, the example ring division manager 200 of FIG. 2 may be implemented by hardware and/or any combination of hardware and executable instructions (e.g., software and/or firmware). Thus, for example, any of the ring connection monitor 210, the owner selector 220, and/or, more generally, the example ring division manager 200 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the ring connection monitor 210 and/or the owner selector 220 is/are hereby expressly defined to include a tangible machine readable storage device or storage disk such as a memory, a digital versatile disk (DVD), a compact disk (CD), a Blu-ray disk, etc. storing the executable instructions. Further still, the example ring division manager 200 of FIG. 2 may include at least one element, process, and/or device in addition to, or instead of, those illustrated in FIG. 2, and/or may include more than one of any or all of the illustrated elements, processes and devices.

Figure 3:
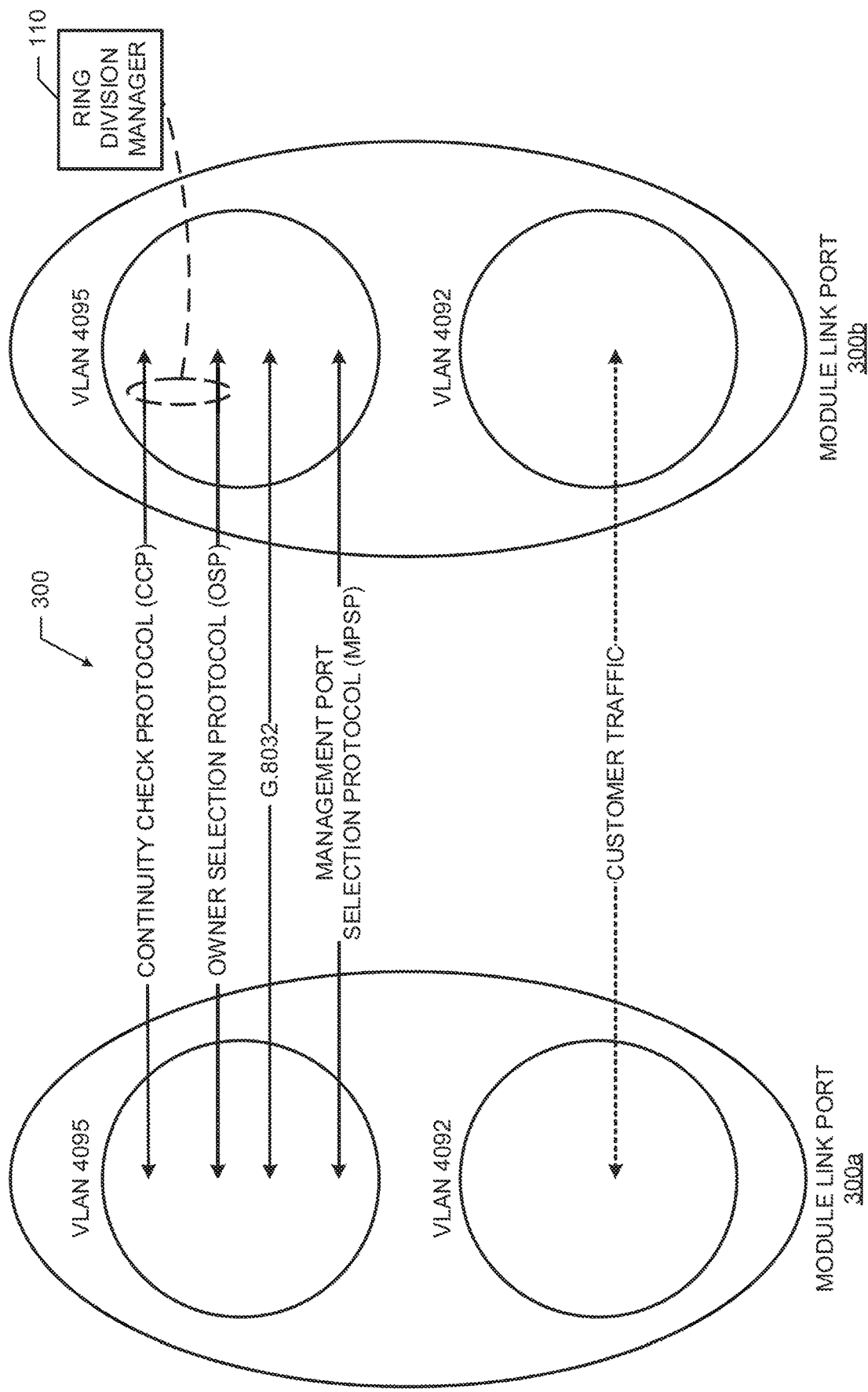
FIG. 3 is a protocol diagram of example communications between ring protection network modules that may each be implemented by the ring protection network modules of FIGS. 1A and 1B and utilized by the ring division manager of FIG. 2 in accordance with an aspect of this disclosure.

FIG. 3 is a protocol diagram of example communications between module link ports 300a, 300b that may each be implemented by the network module 200 of FIG. 2 in accordance with an aspect of this disclosure. For example, the module link ports 300a, 300b may represent connections to the network modules 102a, 102d of FIG. 1A or 1B or the network module 200 of FIG. 2. In the illustrated example of FIG. 3, the link ports 300a, 300b include a VLAN 4095 communication link and a VLAN 4092 communication link (though any VLAN 1-VLAN 4094 may be used for customer traffic). In examples herein, the VLAN 4095 communication link may be used as a communication link for a management network ring of a ring protection network (to communicate with the other network modules 102) and the VLAN 4092 may be used for customer traffic (e.g., to communicate with the service network 130).

As illustrated in FIG. 3, the VLAN 4095 communication link may be used to send CCP communications, OSP communications, G.8032 communications, and MPSP communications. Accordingly, the network modules 102 may send/receive an owner identification corresponding to an owner of the network modules 102 of the link ports via the CCP protocol of FIG. 3. The network modules 102 may send owner information via the OSP protocol. In examples herein, the ring division manager 200 analyzes the CCP and OSP communications to identify disconnections in the ring protection network 120 and/or reconnections between the network modules to create the new ring protection networks 140, 150. The owner selector 220 may then establish an owner to disable uplinks or send instructions to disable uplinks via the G.8032 protocol. The owner of the network modules may then activate an uplink or send instructions to activate an uplink via the MPSP protocol illustrated in FIG. 3. Accordingly, the communication protocols utilized in the VLAN 4095 communication link of FIG. 3 may be used to detect disconnections in a ring protection network and creation of new ring protection networks as well establish owners of the new ring protection networks in accordance with aspects of this disclosure.

FIGS. 4A-4E schematically illustrates an example division over time of the example ring protection network of the system of FIG. 1A into the example ring protection networks of FIG. 1B in accordance with an aspect of this disclosure. In FIGS. 4A-4E, the MAC address (MAC) of the respective network modules 102 along with the owner address (OWNER) of the respective network modules 102 is indicated with the corresponding network module at that particular moment in time of the FIGS. 4A-4E. Additionally, the connections between the modules 102 of FIGS. 4A-4C may include the communication links (e.g., the VLAN 4095 and the VLAN 4092) of FIG. 3. In the following example represented in FIGS. 4A-4E, the network module 102b is the owner of the original ring protection network 120 (both OWNER and MAC are "3"). As will be discussed below, the FIGS. 4A-4E sequentially show the network modules 102a-102f dividing to form two ring protection networks of the network modules 102a-102c and 102d-102f. Furthermore, in FIGS. 4A-4E, clashed lines indicate a deactivated link in customer traffic (e.g., VLAN 4092) between the adjacent network modules, though the management communication (e.g., VLAN 4095) will be active.

Figure 4A:
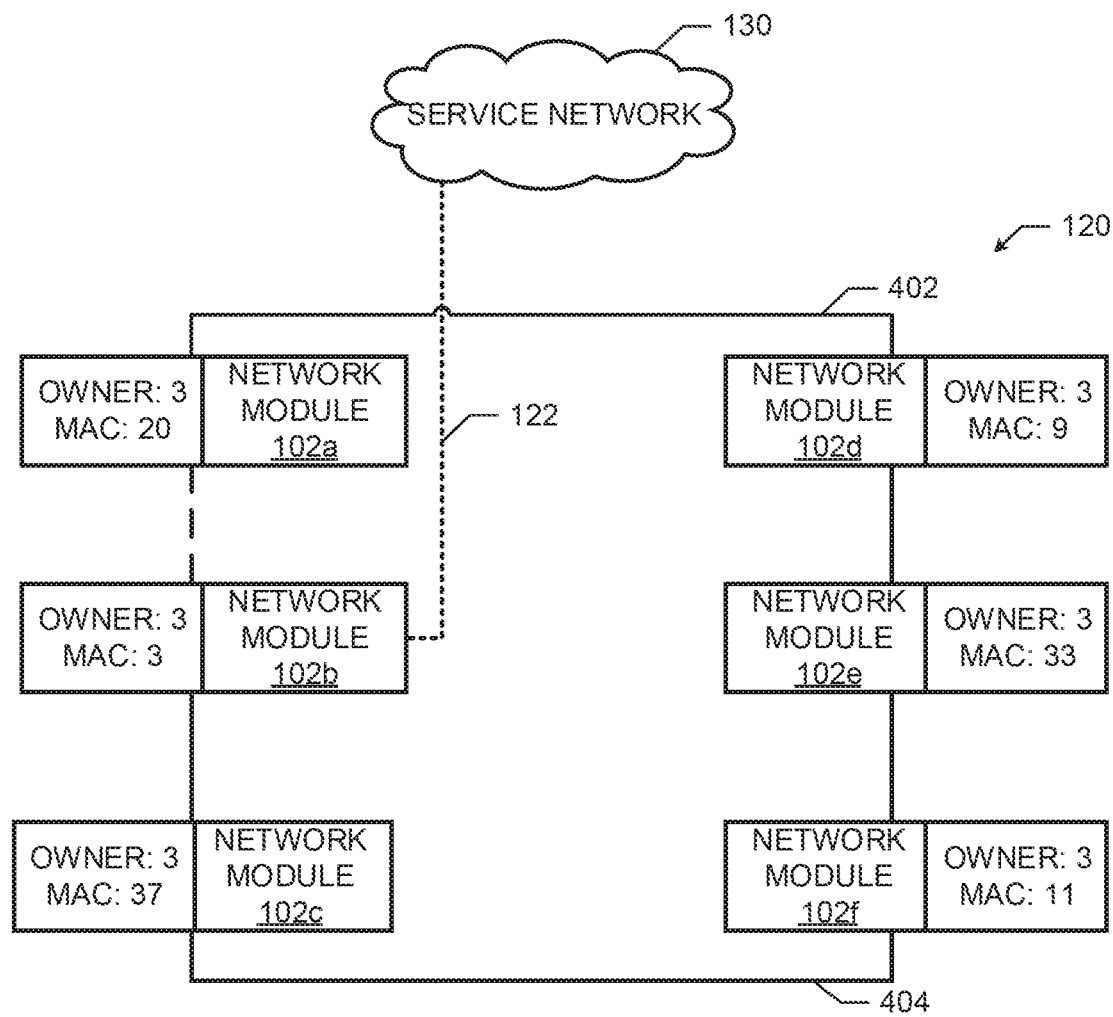
FIGS. 4A-4E schematically illustrates an example division of the example ring protection network of the system of FIG. 1A into the example ring protection networks of FIG. 1B.

In FIG. 4A, the network module 102b serves as the owner of the ring protection network 120, with a single uplink 122 to the customer network and loop prevention via a deactivated customer link with the network module 102a. The links 402 between the network module 102a and the network module 102d and between the network module 102c and the network module 102f are disconnected. In some examples, the links are disconnected simultaneously (or nearly simultaneously) or they may be disconnected one after the other (e.g., within 1 second, 2 seconds, etc.).

Figure 4B:
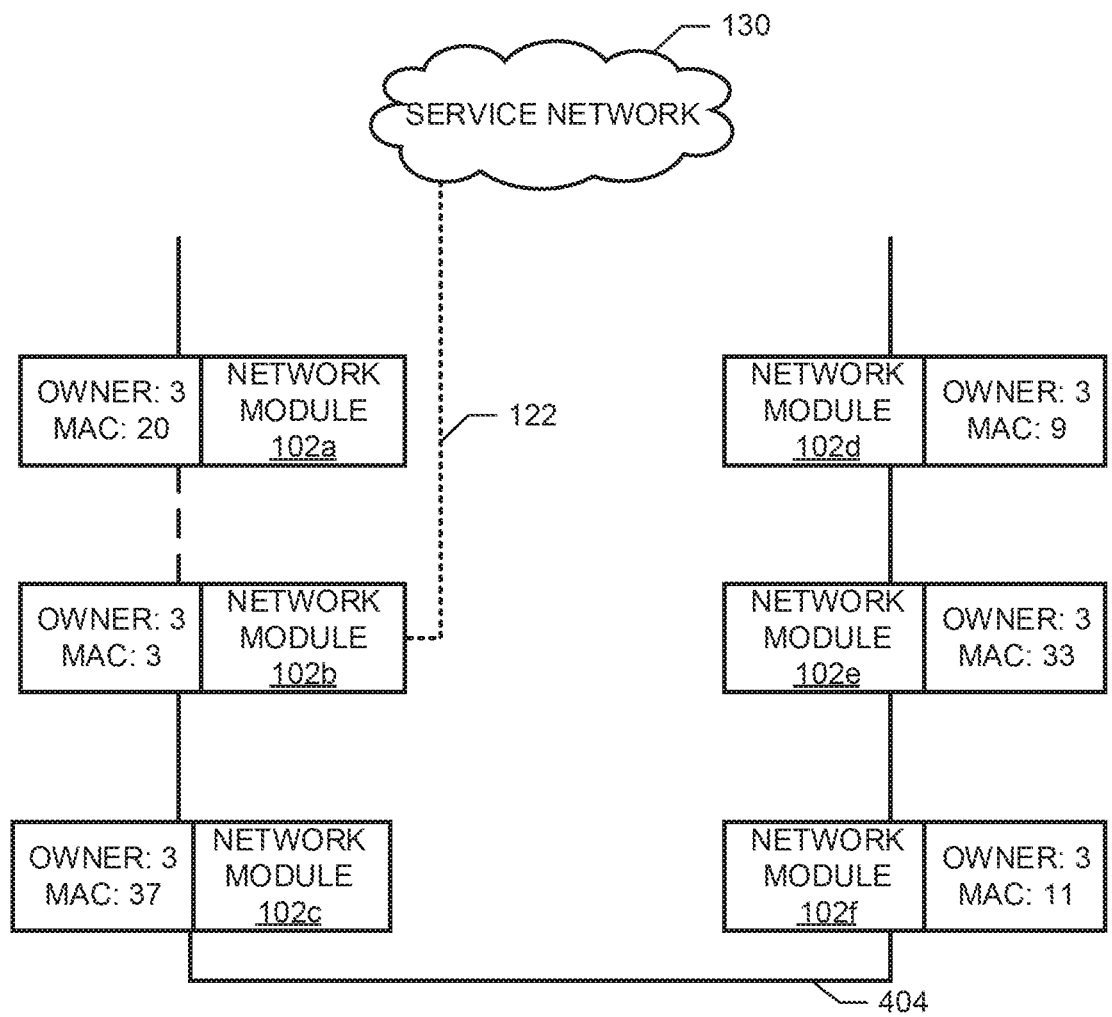

In FIG. 4B, the connection 402 of FIG. 4A between the network modules 102a, 102d is disconnected (e.g., a user unplugs the wire from one of the network modules 102a, 102d, a switch disconnects the wires, etc.). Accordingly, during a period of time in FIG. 4B, the ring division managers of the network module 102a may determine that an owner is present (from and OSP message from the network module 102b) but that there is a disconnection from the network module 102d (due to not receiving a CCP message from 102d). The example network module 102d may also determine that an owner is present (from the OSP message received from the network module 102b via the connection to the network module 102e) but that there is a disconnection from the network module 102a (due to not receiving a CCP message from 102a).

Figure 4C:
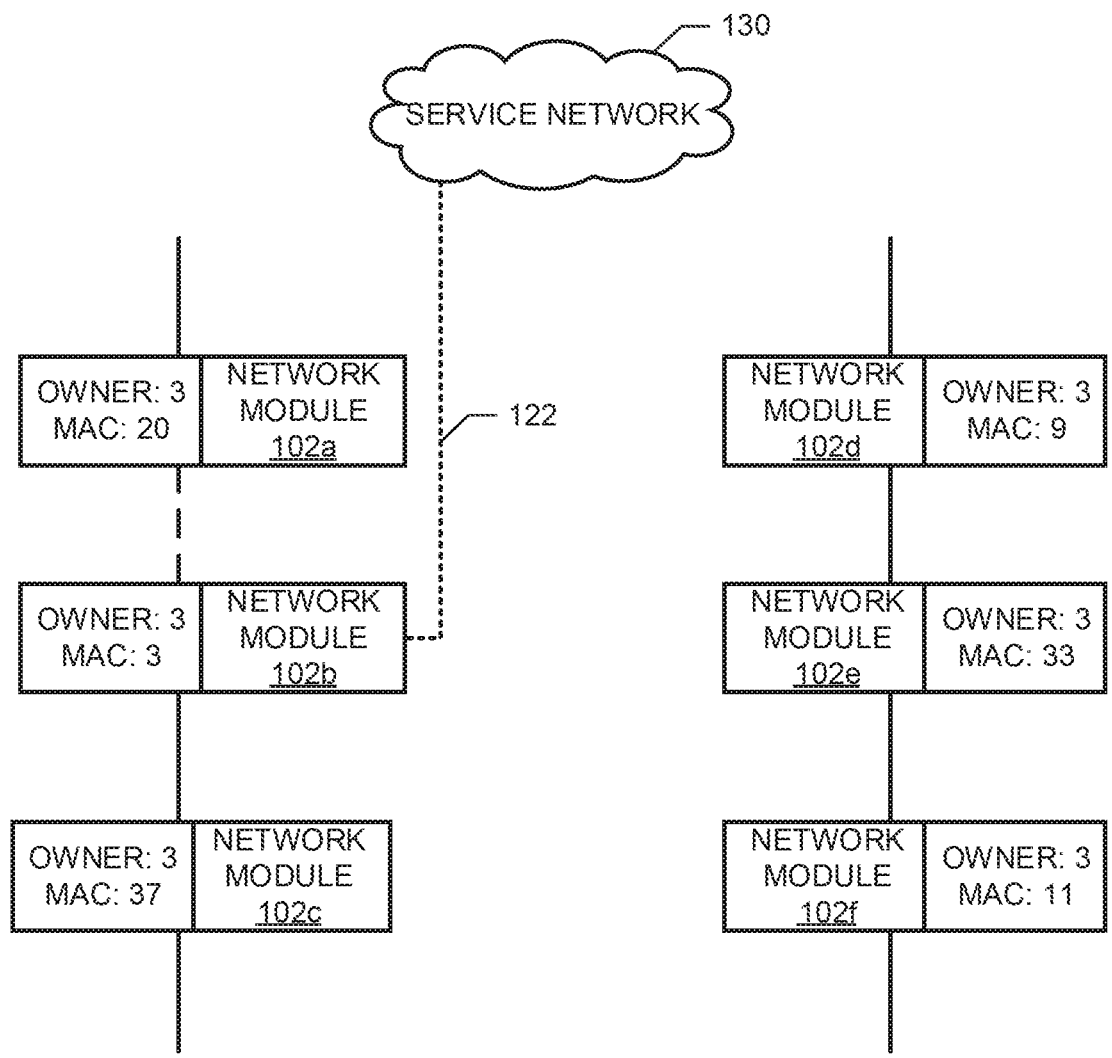

In FIG. 4C, the connection 404 of FIGS. 4A and 4B between the network modules 102c, 102f is disconnected. Accordingly, during a period of time in FIG. 4C, the network module 102c may determine that an owner is still present (due to OSP message from the network module 102b) but there was a disconnection from the network module 102f (due to no longer receiving a CCP message from the network module 102f). Furthermore, the network module 102f may determine that an owner is no longer present (due to no longer receiving an OSP from the network module 102b) and there was a disconnection from the network module 102d (due to no longer receiving CCP messages from the network module 102d). In FIG. 4C, the network module 102f may be the first network module of the network modules 102d, 102e, 102f to determine that no owner is present because it was nearest network module to the owner network module 102b in the ring after the disconnection of the connection 402 between the network modules 102a, 102d. As such, in FIG. 4C, the ring connection monitor 210 of the network module 102f may determine that the network module 1021 is an end network module of a ring protection network without an owner. Meanwhile, the network modules 102d, 102e in FIG. 4C are waiting for an OSP message from the network module 102f.

Figure 4D:
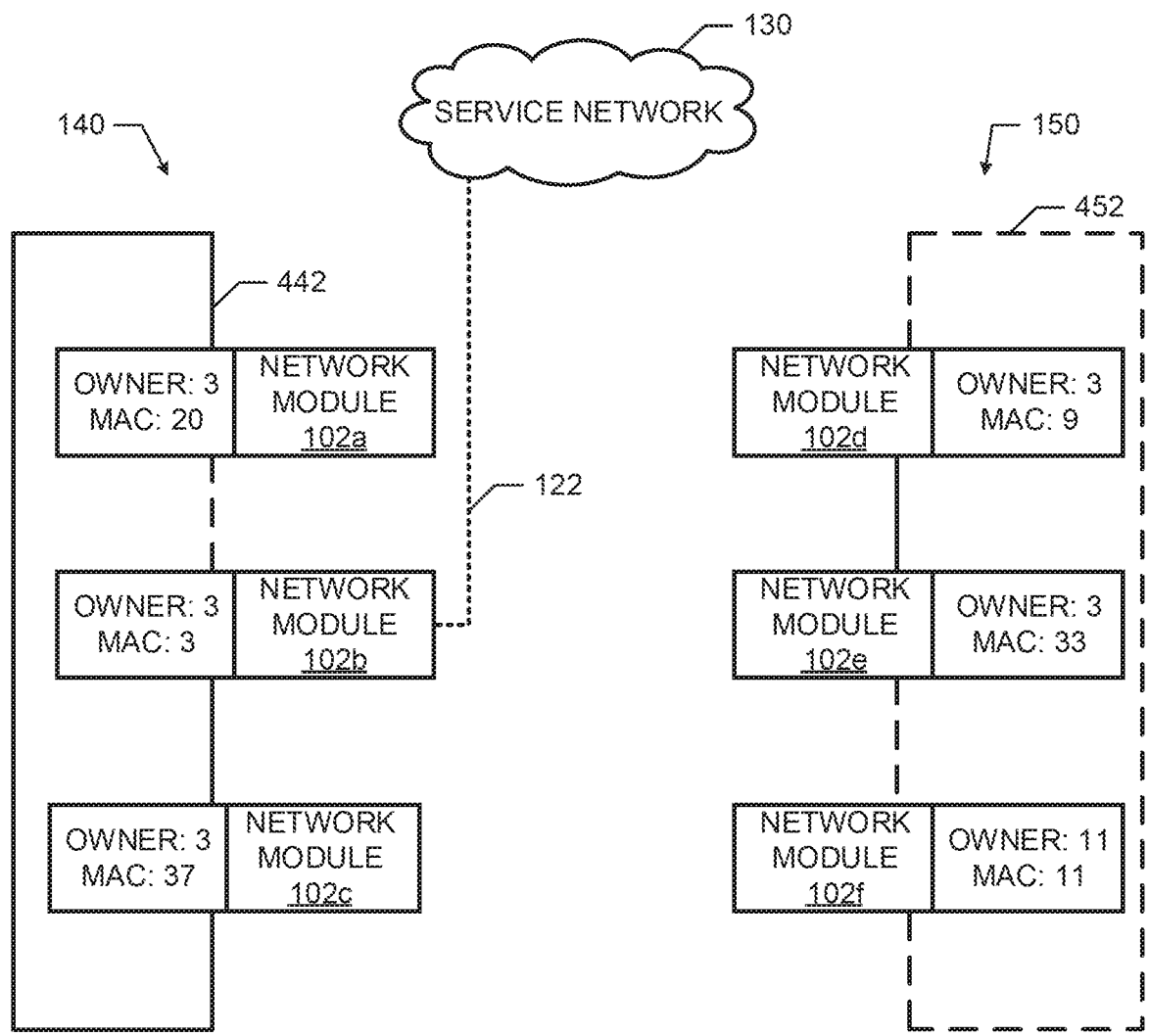

In FIG. 4D, the new ring protection networks 140, 150 are created by new connection 442 between network modules 102a, 102c and the new connection 452 between network modules 102d, 102f, respectively. In FIG. 4D, though the ring connection monitor 210 of the network modules 102a, 102c detected a disconnection from the network modules 102d, 102f, respectively, the ring connection monitors continued to detect a connection with the owner network module 102b. Accordingly, upon establishing the connection 442 between the network modules 102a, 102c within a threshold period of time of disconnecting the connections 402, 404, the newly formed ring protection network 140 may continue to operate with the network module 102b as owner. However, without an owner in the new ring protection network 452, as an end network module, the network module 102f sets itself as owner of the new ring protection network 150. As owner, the network module 102f deactivates customer traffic with its adjacent network modules 102e, 102d to configure the newly formed ring protection network 150. The owner network module 102f begins broadcasting its owner identifier in OSP messages to the other network modules 102e, 102f of the ring protection network 150.

Figure 4E:
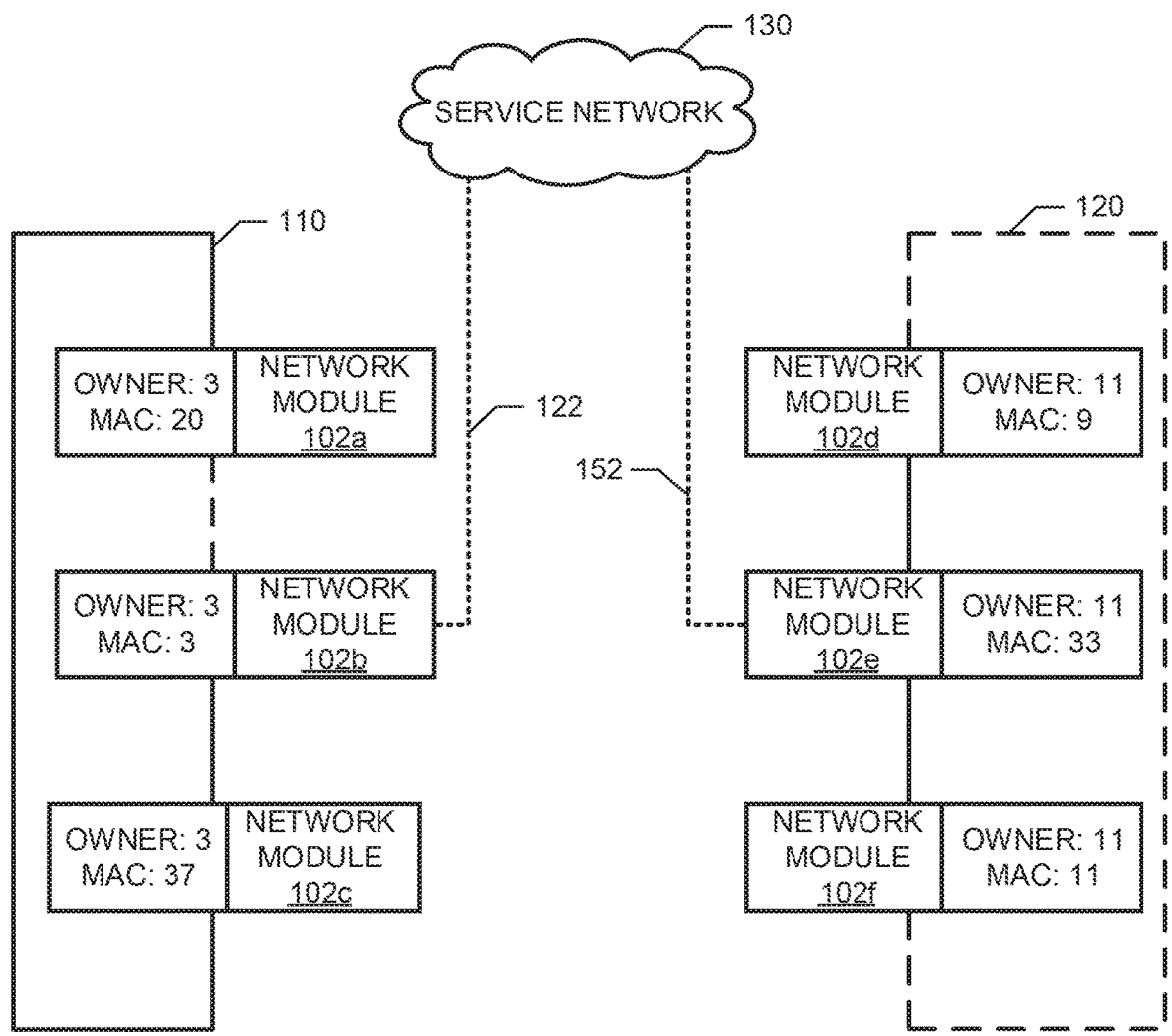

In FIG. 4E, as the network modules 102e, 102f get the new OSP messages and determine that they are receiving new owner communication, the network modules 102e, 102f change their owner to the new owner modules 102f for the new ring protection network 150. Once all the network modules 102d-102f of the new ring protection network 150 have the same owner, the owner network module 102f establishes an uplink 152 with the service network 130 and activates one of the customer traffic links to an adjacent network module (the network module 102e in FIG. 4E) to enable the new ring protection network 150 to manage customer traffic of the service network 130.

Figure 5:
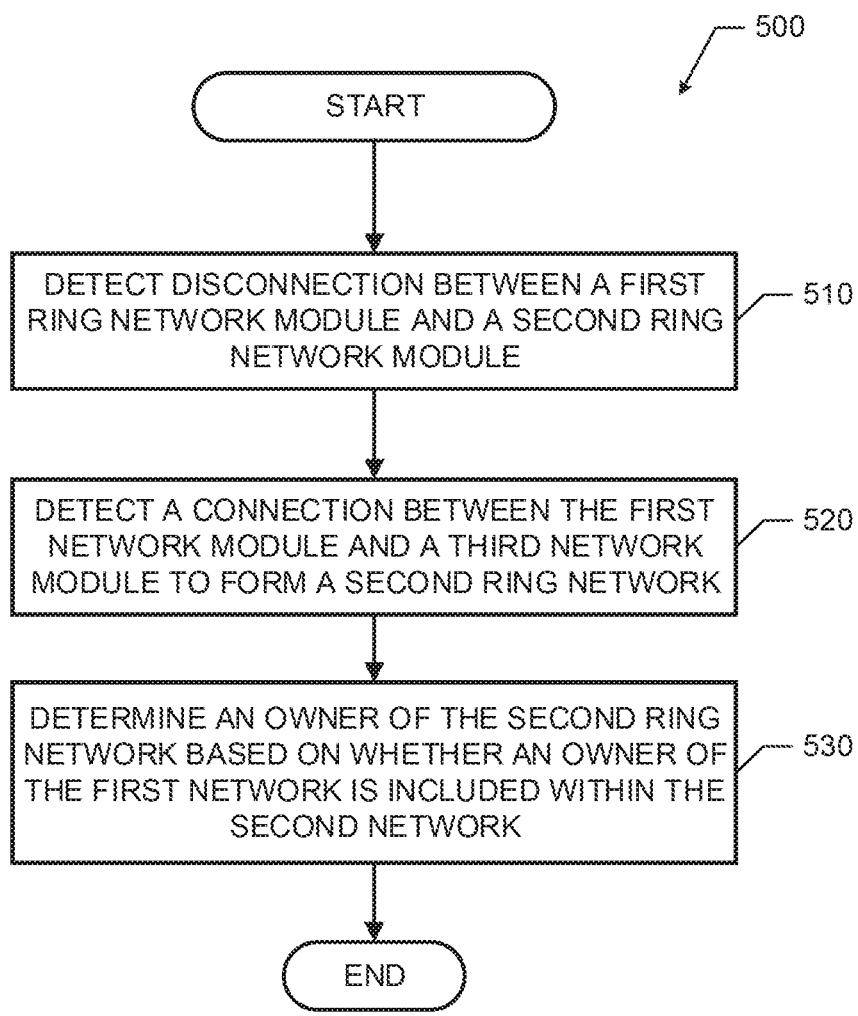
FIG. 5 is a flowchart representative of example machine readable instructions that may be executed to implement the ring division manager of FIG. 2 in accordance with an aspect of this disclosure.

A flowchart representative of example machine readable instructions for implementing the ring division manager 200 of FIG. 2 is shown in FIG. 5. In this example, the machine readable instructions comprise a program/process for execution by a processor such as the processor 712 shown in the example processor platform 700 discussed below in connection with FIG. 7. The program/process may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 712, but the entire program/process and/or parts thereof could alternatively be executed by a device other than the processor 712 and/or embodied in firmware or dedicated hardware. Further, although the example program is described with reference to the flowchart illustrated in FIG. 5, many other methods of implementing the example ring division manager 200 may alternatively be used. For example, the order of execution of the blocks may be changed, and/or some of the blocks described may be changed, eliminated, or combined.

The process 500 of FIG. 5 begins with an initiation of the ring division manager 200 (e.g., upon startup, upon instructions from a user, upon startup of a device implementing the ring division manager 200 (e.g., the network modules 102), etc.). The example process 500 of FIG. 5 may be executed to configure a ring protection network (e.g., the ring protection network 150) formed from network modules of a previous ring protection network (e.g., the ring protection network 120). At block 510, the ring connection monitor 210 detects a disconnection between a first ring protection network module and a second ring protection network module. For example, at block 510, the ring connection monitor 210 of the network module 102f may determine that CCP messages have not been received from the network module 102c, thus detecting a disconnection. At block 520, the ring connection monitor 210 detects a connection between the first network module and a third network module. For example, at block 520, the ring connection monitor 210 of the network module 102*f* may determine that CCP messages are being received from a different network module (i.e., the network module 102*d* rather than the network module 102*c*), thus determining connection to a different network module.

At block 530 of FIG. 5, the owner selector 220 determines an owner of the second ring protection network based on whether an owner of the first ring protection network is included within the second ring protection network. For example, at block 530, the owner selector 220 determines whether OSP messages have been received after the disconnection. In some examples, if OSP messages have been received, then the owner selector 220 may not change the owner. In some examples, if the OSP messages indicated an owner different from a previous owner of the network module, then the owner selector 220 may change the owner of its network module. If, however, the owner selector 220 determines that no owner messages have been received, the owner selector 220 may set its network module as the owner of the second ring protection network.

Figure 6:
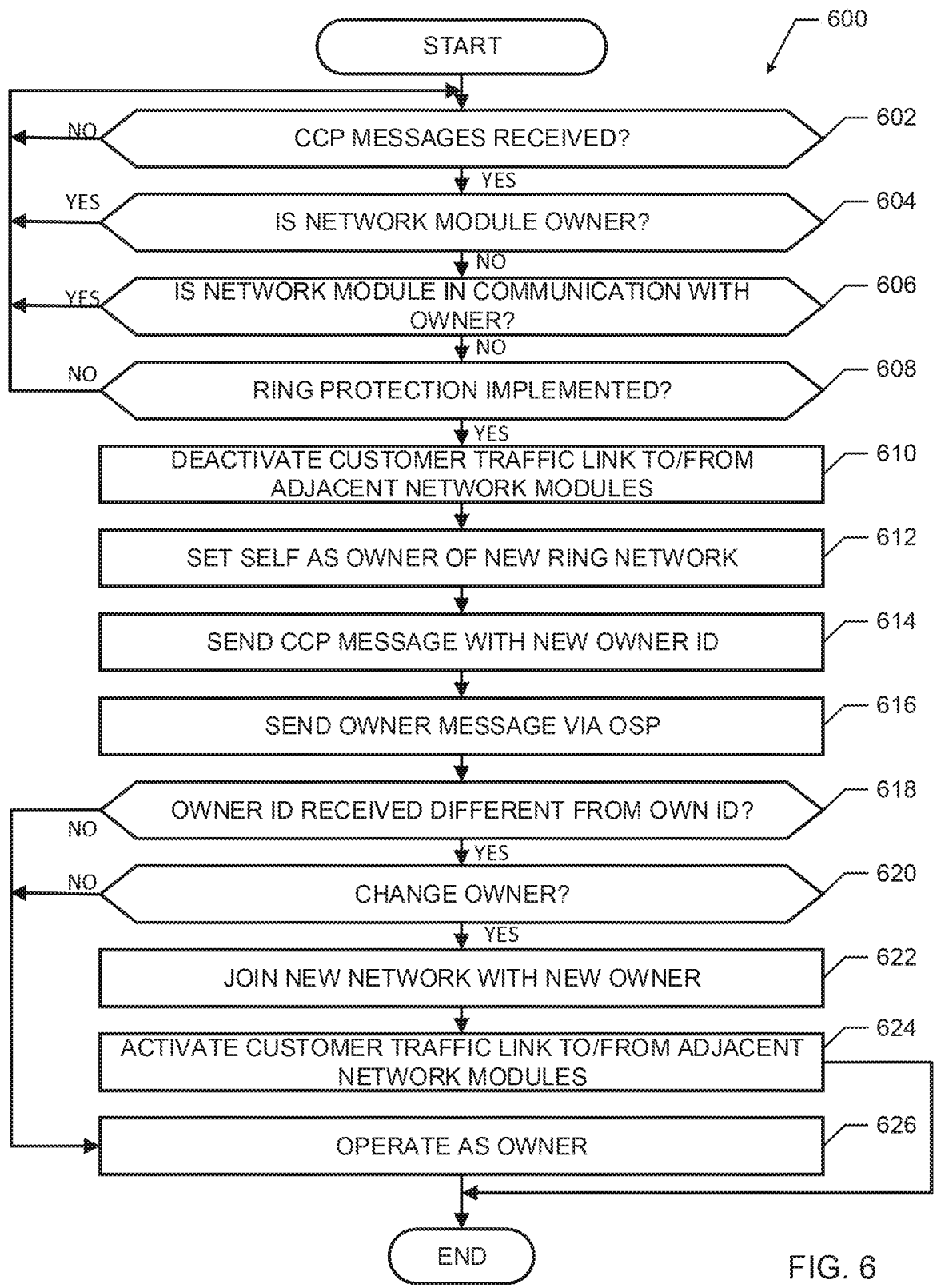
FIG. 6 is a flowchart representative of example machine readable instructions that may be executed to implement the network modules of FIG. 1 including the ring division manager of FIG. 2 in accordance with an aspect of this disclosure.

A flowchart representative of example machine readable instructions for implementing the network modules 102 of FIGS. 1A, 1B is shown in FIG. 6. In this example, the machine readable instructions comprise a program/process for execution by a processor such as the processor 712 shown in the example processor platform 700 discussed below in connection with FIG. 7. The program/process may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 712, but the entire program/process and/or parts thereof could alternatively be executed by a device other than the processor 712 and/or embodied in firmware or dedicated hardware. Further, although the example program is described with reference to the flowchart illustrated in FIG. 6, many other methods of implementing the example network modules 102 may alternatively be used. For example, the order of execution of the blocks may be changed, and/or some of the blocks described may be changed, eliminated, or combined.

The process 600 of FIG. 6 begins with an initiation of a network module 102. The example process 600 of FIG. 6 may be executed to implement any one of the network modules 102 of the ring protection network 120 to enable configuration of a new ring protection network (e.g., the ring protection networks 140, 150) that is created from network modules 102 of the ring protection network 120. At block 602, the ring connection manager 210 of a network module 102 determines whether a CCP message was received from adjacent network modules 102. If CCP messages were received, control returns to block 602 to check for the next CCP messages. If the CCP messages were not received at block 602, then the network module 102 determines whether it is the owner of the ring protection network 120 (block 604). If the network module 102 is the owner of the ring protection network 120 (e.g., owner ID matches ID of the network module 102, similar to the network module 102*b* of FIG. 4D), then control returns to block 602 to continue to monitor for CCP messages. If, at block 604, the network module 102 is not the owner, then the network module determines whether it is in communication with the owner (block 606). For example, at block 606 the network module determines whether an OSP message from an owner has been received within a previous time period. If, at block 606, the network module 102 determines that it is in communication with the ring protection network owner (e.g., similar to network modules 102*a*, 102*c* of FIG. 4D, then control returns to block 602 to continue monitoring for CCP messages. If, at block 606, the network module is not in communication with the owner (e.g., similar to network module 102*f* of FIG. 4D), then, the network module 102 determines whether the ring protection network is implementing ring protection. If ring protection is not being implemented (block 608), then control returns to block 602. If ring protection is being implemented (block 608), then the network module deactivates customer traffic to/from the adjacent network modules.

At block 612, the network module 102 sets itself as owner of a new ring protection network (e.g., a ring protection network). At block 614, the network module sends new owner ID via CCP messages to adjacent network modules and sends an owner message via OSP at block 616. At block 618, the network module determines whether an owner ID has been received (from other network modules in the new ring protection network) that is different from the network modules own identifier. If, at block 618, the network module 102 receives an owner ID that is not different from the other network modules (i.e., the other network modules have accepted the network module as the new owner, similar to FIG. 4E), then control advances to block 626.

If, at block 618, the network module 102 does receive an owner ID that is different from the ID of the network module 102, then the network module 102 determines whether to change owner (i.e., whether to stay owner or change to owner corresponding to different owner ID). For example, the network module may compare owner IDs and select the owner ID based on a certain criteria (e.g., which ID is greater, lesser, etc.). If the network module 102, at block 620, determines not to change the owner ID, control advances to block 626. If, at block 620, the network module 102 determines to change owner, then the network modules joins the new network by setting its owner status to the new owner (block 622). At block 624, the network module 102 activates the customer traffic links to/from the adjacent network modules. After block 624, the example process 600 ends. In some examples, control may return to block 610.

At block 626, the network module 102 operates as owner of the new ring protection network. For example, at block 626, the network module 102 continue to monitor CCP and OSM messages. The network module 102, at block 626, may further reactivate customer traffic links with adjacent network module 102 but prevent loops in the customer traffic in the new ring protection network. Furthermore, the network module 102 may establish an uplink (e.g., the uplink 152) at block 626 to the customer service network 130 for the new ring protection network. After block 626, the example process 600 ends.

As mentioned above, the example processes of FIGS. 5 and 6 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 7:
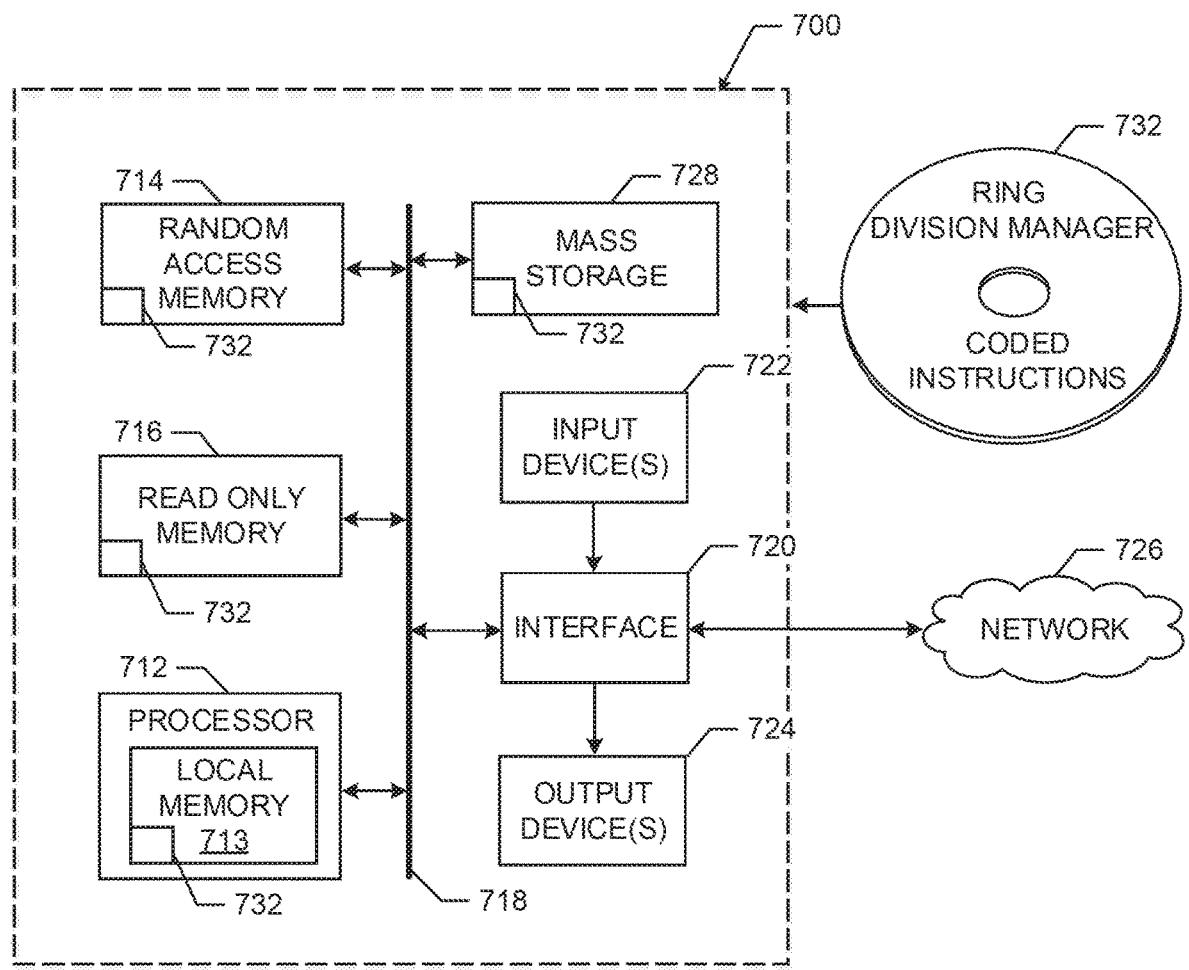
FIG. 7 is a block diagram of an example processor platform capable of executing the instructions of FIGS. F1 and/or F2 to implement the A1 of FIG. B.

FIG. 7 is a block diagram of an example processor platform 700 capable of executing the instructions of FIGS. 5 and 6 to implement the ring division manager 200 of FIG. 2 and/or the network modules of FIGS. 1A, 1B, respectively. The example processor platform 700 may be or may be included in any type of apparatus, such as a server, a personal computer, a mobile device, a network device, or any other type of computing device.

The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, at least one input device 722 is connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint, and/or a voice recognition system.

At least one output device 724 is also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, may include a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes at least one mass storage device 728 for storing executable instructions (e.g., software) and/or data. Examples of such mass storage device(s) 728 include floppy disk drives, hard drive disks, compact disk drives, Blu-ray disk drives, RAID systems, and digital versatile disk (DVD) drives.

The coded instructions 732 of FIGS. 5 and/or 6 may be stored in the mass storage device 728, in the local memory 713 in the volatile memory 714, in the non-volatile memory 716, and/or on a removable tangible machine readable storage medium such as a CD or DVD.

From the foregoing, it will be appreciated that the above disclosed methods, apparatus and articles of manufacture enable configuration of ring protection networks formed from a previous ring protection networks. In examples herein, the network modules of a ring protection network may detect a disconnection from a ring protection network, detect a reconnection to another network module, and set an owner for the newly created ring protection networks using CCP and OSP messages. As such, the newly created ring network may preserve the integrity of the new created ring protection networks.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   detecting a disconnection between a first network module and a second network module of a first ring protection network;
   detecting a connection between the first network module and a third network module to form a second ring protection network, the second ring protection network divided from the first ring protection network; and
   determining an owner for the second ring protection network based on whether an owner of the first ring protection network is included within the second ring protection network, the owner of the second ring protection network being a network module of the second ring protection network.

2. The method of claim 1, further comprising: determining that the owner of the first ring protection network is included in the second ring protection network; and
   selecting the owner of the second ring protection network as the owner of the first ring protection network when the second ring protection network includes the owner of the first ring protection network.

3. The method of claim 1, further comprising: determining that the owner of the first ring protection network is not included in the second ring protection network; and
setting the first network module as the owner of the second ring protection network in response to determining that the owner of the first ring protection network is not included in the second ring protection network.

4. The method of claim 3, further comprising determining the owner of the first ring protection network is not included in the second ring protection network based on the first network module not receiving an owner identifier message from the owner of the first ring protection network due to the disconnection of the first network module from the second network module.

5. The method of claim 3, wherein the first network module disables customer traffic between adjacent network modules of the first network module until the adjacent network modules accept the first network module as owner.

6. The method of claim 1, further comprising detecting the disconnection between the first network module and the second network module based on a period of time passing without the first network module receiving a data packet via a continuity check protocol from the second network module, the second network module being adjacent to the first network module in the first ring protection network.

7. The method of claim 1, wherein the detected disconnection between the first network module and the second network module and the detected connection between the first network module and the third network module occur within a designated threshold period of time.

8. An apparatus comprising:
a ring connection monitor to:
detect a disconnection from a network module of a ring protection network; and
an owner selector to:
determine that an owner of the ring protection network is not in communication with the apparatus; and
set the apparatus as owner of a new ring protection network, the new ring protection network divided from the ring protection network.

9. The apparatus of claim 8, wherein the ring connection monitor detects the disconnection based on a period of time passing without receiving a continuity check protocol message from an adjacent network module of the ring protection network.

10. The apparatus of claim 8, wherein the owner selector determines that the owner of the ring protection network is not in communication with the apparatus based on a period of time passing without receiving an owner selection protocol message from the owner.

11. The apparatus of claim 8, further comprising a ring protection manager to disable customer traffic with adjacent network modules in the new ring protection network until all network modules of the new ring protection network accept the apparatus as the owner of the new ring protection network.

12. The apparatus of claim 8, further comprising a ring protection manager to establish an uplink between the new ring protection network and a service network.

13. A non-transitory machine readable medium comprising instructions that, when executed, cause a machine to at least:
detect a disconnection in a ring protection network;
determine whether an owner of the ring protection network is in a new ring protection network divided from the ring protection network; and
set a network module of the new ring protection network as the owner of the new ring protection network when the owner of the ring protection network is not included in the new ring protection network.

14. The non-transitory readable medium of claim 13, wherein the instructions, when executed, further cause the machine to:
monitor continuity check protocol messages to detect the disconnection in the ring protection network.

15. The non-transitory readable medium of claim 13, wherein the instructions, when executed, further cause the machine to:
monitor owner selection protocol messages broadcast from the owner of the ring protection network to determine whether the owner of the ring protection network is in the new ring protection network.

* * * * *